Dec. 7, 1965 C. E. ADLER 3,221,645
PRINTER
Filed Aug. 23, 1963

INVENTOR.
CLARENCE E. ADLER
BY
Marshall, Wilson and Yeasting
-attorneys-

Dec. 7, 1965    C. E. ADLER    3,221,645
PRINTER

Filed Aug. 23, 1963    7 Sheets-Sheet 2

INVENTOR.
CLARENCE E. ADLER
BY
Marshall, Wilson and Yeasting
-attorneys-

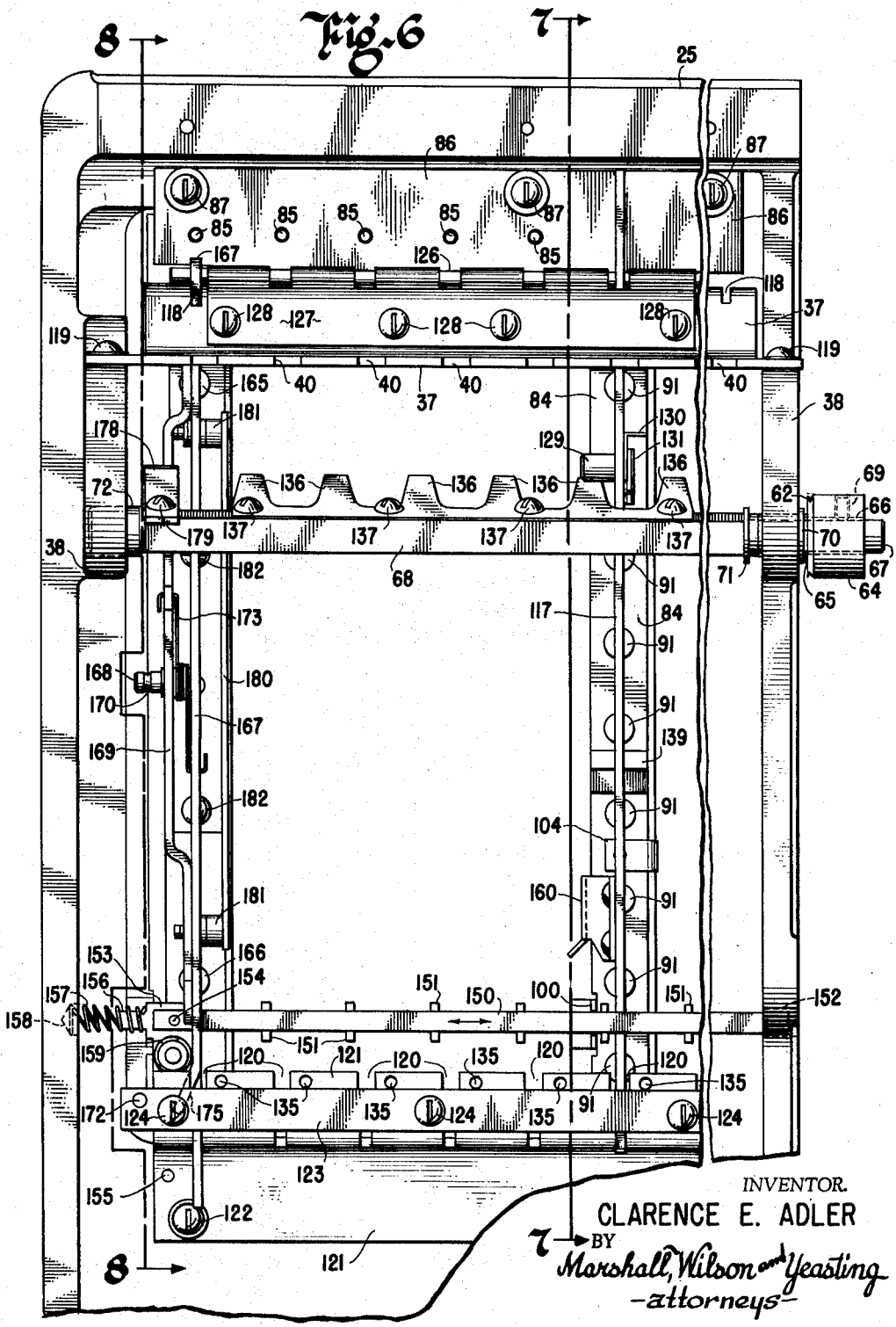

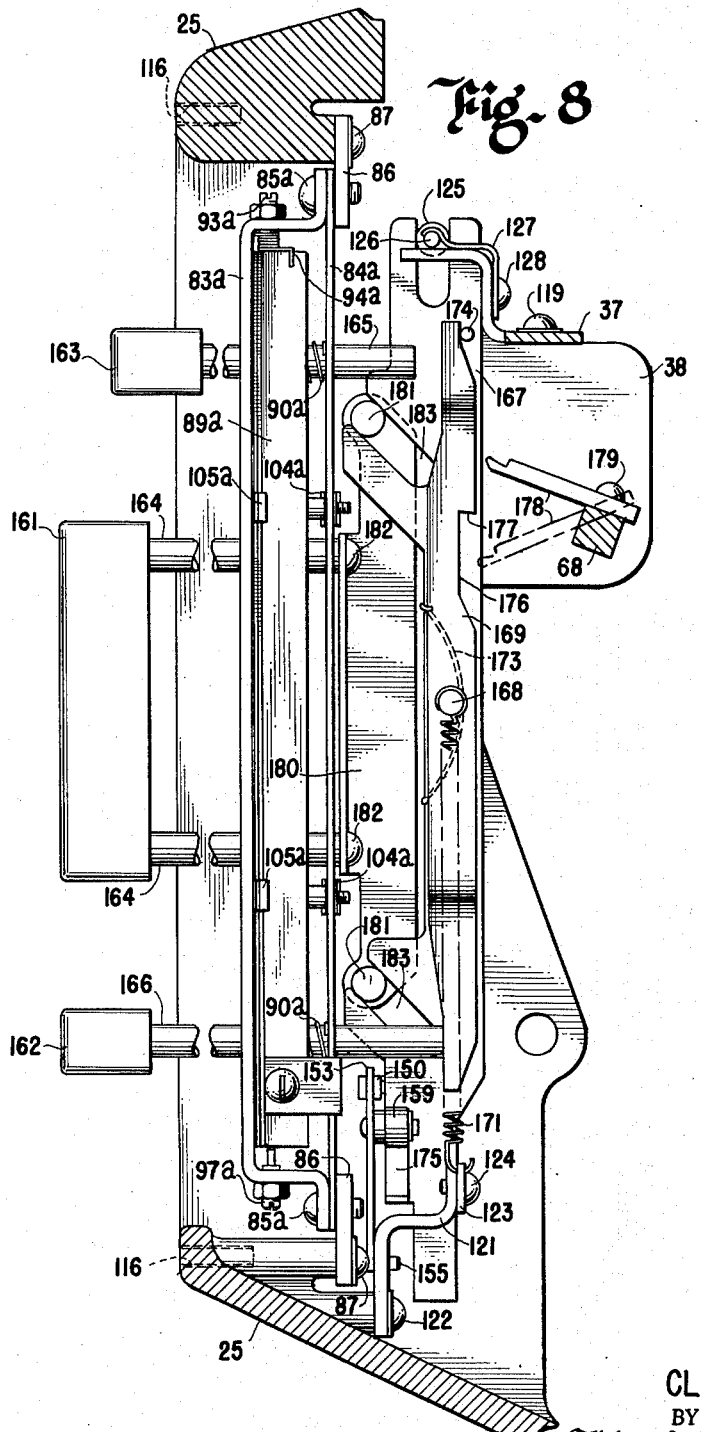

Dec. 7, 1965   C. E. ADLER   3,221,645
PRINTER
Filed Aug. 23, 1963   7 Sheets-Sheet 6

INVENTOR.
CLARENCE E. ADLER
BY Marshall, Wilson and Yeasting
—attorneys—

INVENTOR.
CLARENCE E. ADLER

United States Patent Office 3,221,645
Patented Dec. 7, 1965

3,221,645
PRINTER
Clarence E. Adler, Toledo, Ohio, assignor to Toledo Scale Corporation, Toledo, Ohio, a corporation of Ohio
Filed Aug. 23, 1963, Ser. No. 304,080
10 Claims. (Cl. 101—95)

This invention relates to an improved printing device.

The printing device is of simple and low cost construction, yet is rugged, reliable and accurate, and is particularly well suited for use in industrial installations. It is especially useful in industrial installations in conjunction with a weighing scale for printing weight indications in digtal form.

Nearly every industrial installation of a printing weighing scale requires that ancillary information of one kind or another be printed along with the weight indications. One may demand that customer order or code numbers be printed and these perhaps in peculiar positions; another may require that gaps be left in the printed matter for the future use of customers; some require that time and/or date information be printed while others do not; many need identification of each weight print by means of a consecutive number, etc. Hence, nearly every industrial installation is unique and creates its own special problems in connection with the arrangement and the kind of the ancillary information which is to be printed together with the weight indications.

A printer, in conjunction with a weighing scale, for printing weight indications in digital form is shown and described in detail in U.S. Patent No. 2,922,361 issued January 26, 1960 in the names of C. E. Adler and G. T. Gray. U.S. Patent No. 3,001,471 issued September 26, 1961 in the name of G. T. Gray shows and describes a printer in which auxiliary printing mechanisms are added in various arrangements to the basic printing mechanism which is shown and described in the above U.S. Patent No. 2,922,361. These auxiliary printing mechanisms print the above described ancillary information. One of these auxiliary printing mechanisms is a selective numbering device for printing weight identification words such as "ore," "limestone," "tare," "gross," and "net" and selective numbers such as customer order or code numbers.

The above prior selective numbering device included manual reset mechanism including a reset bar. No automatic resetting could be accomplished. The prior reset bar was guided by two plungers. Eccentrically applied forces caused the reset bar to cock.

The prior selective numbering device also included number keys operatively connected to the printing sectors in the printer, which keys were difficult to push in because the return spring forces in the printer and friction of cables in their casings had to be overcome by finger pressure. Also, the working parts easily got out of adjustment.

Instead of operatively connecting the number keys to the printing sectors, the keys optionally could be connected to an electrical readout. This prior electrical readout included one brush operatively connected to the keys in each row of keys. The brush was moved on selector contacts to a position corresponding to the operated one of the keys. This arrangement was generally unsatisfactory because as the parts wore the brush often stopped between the contacts or terminals, producing no electrical readout at all.

Accordingly, the objects of this invention are to improve printers and, particularly, selective numbering mechanisms, to increase the precision of such mechanisms, to facilitate the mechanical adjustment of such mechanisms, to simplify the construction of such mechanisms, to provide automatic resetting for the keys in such mechanisms, to so stabilize the reset bars in such mechanisms that eccentrically applied forces can not cock such bars, to so improve electrical readouts for such mechanisms that the brushes always are certain to make contact, and to make the keys in such mechanisms easy to operate.

One embodiment of this invention enabling the realization of these objects is a printer provided with the basic printing mechanism which is shown and described in the above U.S. Patent No. 2,922,361 and all or part of the record strip mechanism which is shown and described in U.S. Patent No. 3,093,066 issued June 11, 1963 in the name of C. E. Adler, in which the improved selective numbering mechanism of the invention is substituted for the prior selective numbering mechanism. The selective numbering mechanism of the invention is driven from such record strip mechanism.

The selective numbering mechanism of the invention includes a reset bar guided by two plungers tied together by a member the ends of which carry rollers that cam a slide in opposition to resilient means in a direction perpendicular to movement of the bar. The rollers move in parallel slots in the slide preventing eccentrically applied forces applied to the reset bar from cocking the reset bar. The slide operates key resetting mechanism to clear the keyboard in a manner similar to the way in which the key resetting mechanism in the above prior selective numbering mechanism is operated.

The slide carries a pivotally mounted rocking lever which normally is urged by resilient means against a stop pin. Automatic resetting is accomplished by means including this rocking lever and happens whenever an automatic reset button is actuated. The automatic resetting mechanism is driven from the above record strip mechanism and releases the keys after every printing cycle to clear the keyboard, the drive moving the rocking lever and the attached slide in the same direction as does the above reset bar to operate the key resetting mechanism. A manual reset button also is provided which, when it is operated, so pivots the rocking lever away from the stop pin that the drive no longer can engage the lever to cause automatic resetting. In such condition, the reset bar is moved by finger pressure to clear the keyboard. The automatic reset button is so interlocked with the manual reset button that only one or the other of the buttons can be operated at any one time.

The keys of the keyboard function as stops which limit the movement of slides that set up printing sectors. The keys push in easily since they function merely as preselectors, the slides being driven against the selected keys by the above drive, i.e., by power supplied by means other than finger pressure. The slides, when they are operated, so lock the above manual or automatic reset that reset cannot occur during printing.

An electrical readout also is provided. Each key stem carries a brush. The brushes are engageable with strip contacts on a printed circuit board juxtaposed to the key stems to complete electrical circuits which correspond to the operated ones of the keys.

In accordance with the above, one feature of this invention resides in guiding the rollers which are operatively connected to the reset bar in the parallel slots so that forces applied eccentrically to the reset bar do not cock it. That is, one feature resides in a reset bar stabilizer.

Another feature resides in automatic resetting. While the automatic reset button remains depressed, the keyboard keys are released after every printing cycle.

Still another feature resides in the mechanical interlock between the automatic and manual reset buttons. Only one or the other of the buttons can be operated at any one time.

A further feature resides in the pre-selection mechanism which permits the keys to be pushed in easily. Keys in the above prior printers were difficult to push in because the return spring forces in the printers and friction of cables in their casings had to be overcome. The keys in the selective numbering device of the invention push in easily since they function merely as pre-selectors, the printing wheels or sectors being set up by power supplied by means other than finger pressure.

Another feature resides in automatically locking the manual and automatic reset mechanism whenever selective characters or numbers are set up for printing so that reset cannot occur during printing.

Still another feature resides in the improved electrical readout which provides a brush for each number which is certain to make electrical contact in contrast to the prior brush for each order, i.e., for each set of nine numbers, which prior brush sometimes came to rest between terminals.

The above and other objects and features of this invention will be appreciated more fully from the following detailed description when read with reference to the accompanying drawings wherein:

FIG. 6 is an enlarged, fragmentary, rear elevational view as seen looking into the back of the printer shown in FIG. 1;

FIG. 8 is a vertical sectional view taken along the line 8—8 of FIG. 6;

FIG. 9 is a side elevational view of an element shown connected in the device as illustrated in FIG. 8;

Figure 1:
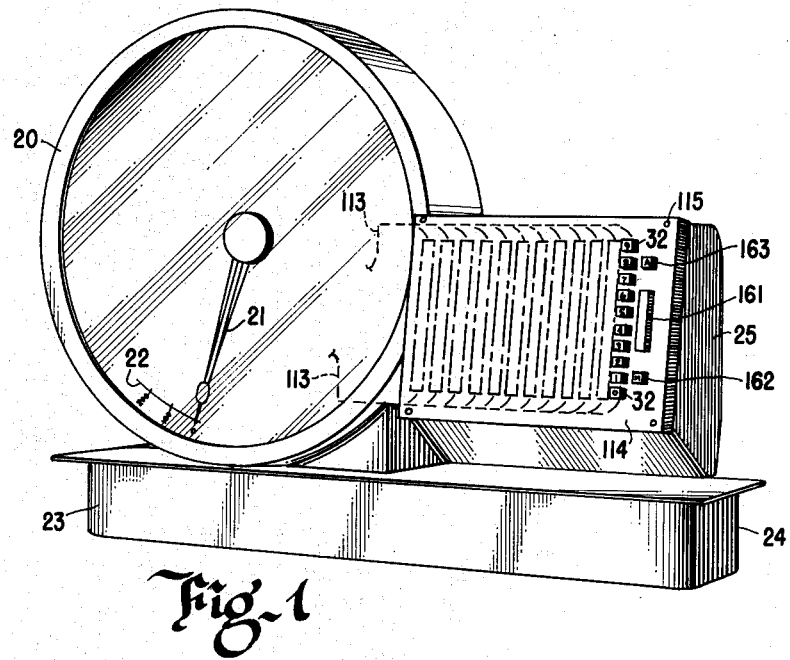
FIG. 1 is a perspective view of a weighing scale dial mechanism showing the location of the printer as it is mounted on a weighing scale.

Referring to the drawings, for the purpose of illustration, the printer is shown in connection with an ordinary dial type weighing scale. Such a scale comprises a dial housing 20 that contains automatic load counterbalancing and indicating mechanism which includes an indicator 21 that is rotated through increments of angle which are proportional to increments of weight applied to the scale and that indicates such weights on a stationary indicia-bearing chart 22. The dial housing 20 is mounted on the top of a scale column 23 of which only the top portion is shown in FIG. 1.

Mechanical chart reading mechanism which is shown and described in the foregoing U.S. Patent No. 2,922,361 is located within the dial housing 20 and is cable-connected to the printer which is contained within its housing 24 and case 25 and operated according to the scale readings. The printer may be operated by any of the usual means for setting up printing members, such as type wheels or sectors, or by hand.

The basic printing mechanism within the printer case 25 is shown and described in detail in the foregoing U.S. Patent No. 2,922,361 to which the selective numbering mechanism of the invention is added, such selective numbering mechanism being driven from record strip mechanism which is shown in the above U.S. Patent No. 3,093,066 as being added to the foregoing basic printing mechanism. A complete printer may include the basic printing mechanism (U.S. Patent No. 2,922,361) plus the record strip mechanism (U.S. Patent No. 3,093,066) plus the selective numbering mechanism of the invention or it may include such combination with the record strip mechanism omitted depending upon the customer's requirements. When the record strip mechanism is omitted, enough of its drive mechanism is used to drive the selective numbering device of the invention, i.e., the record strip drive mechanism drives the record strip and/or the selective numbering device.

As shown in the foregoing U.S. Patent No. 2,922,361, the basic printing mechanism includes cables, one for each decade for example in a four place number, that are led through Bowden cable casings (not shown) ends of which are supported by means of a cable guide shaft 26 (FIG. 10) mounted within the case 25 and that run from the dial housing 20 into the case 25. One end of each of the cables is connected to the mechanical chart reading mechanism and the other end of each of the cables is connected to a return spring (not shown) which springs are hooked on a stationary threaded shaft 27 within the case 25, each of the cables being secured intermediate its ends to a weight printing sector. Broken lines 28 in FIG. 10 indicate a group of four of such printing sectors. The printing sectors 28 are rotatably mounted on a stationary sector shaft 29 extending horizontally from a vertical end frame 30 which also functions as a support for the cable guide shaft 26 and the threaded shaft 27.

Additional printing sectors 31 are rotatably mounted on the sector shaft 29. The auxiliary printing sectors 31 are rotated into printing position by punching selected keys or buttons 32 shown on the front of the printer case 25 in FIG. 1 and then initiating a power print cycle. Each of the vertical rows of keys 32 is identical, there being room for twelve vertical rows as shown in FIG. 1. The row shown in full lines in FIG. 1 contains ten keys representative of the numbers from zero through nine. A printing sector 31 is provided for each row of keys 32, there being six sectors 31 shown in FIG. 10. The number of vertical rows of keys 32 with their printing sectors 31 depends upon the customer's requirements. In addition to printing selective numbers for customer order or code numbers, the sectors 31 can print words such as "ore," "limestone," "tare," "gross," and "net."

The printing sectors 28 and 31 are alike, except for the information that they print and except that the printing type on the sectors 31 are not arranged in the usual order from "0–9," the auxiliary printing sectors 31 being set up by Bowden cables like the Bowden cables described but not shown hereinbefore in connection with the weight printing sectors 28. The auxiliary printing sectors 31 together with their Bowden cables and casings are similar to their counterparts in the prior selective numbering device shown and described in the foregoing U.S. Patent No. 3,001,471. The prior selective numbering device included number keys operatively connected to the printing sectors, which keys were difficult to push in because the return spring forces in the printer and friction of the cables in their casings had to be overcome by finger pressure. As hereinafter described, the keys 32 of the selective numbering device of the invention function as stops which limit the movement of slides that set up the printing sectors 31. The keys 32 push in easily since they function merely as pre-selectors, the slides being driven by power supplied by means other than finger pressure.

Figure 11:
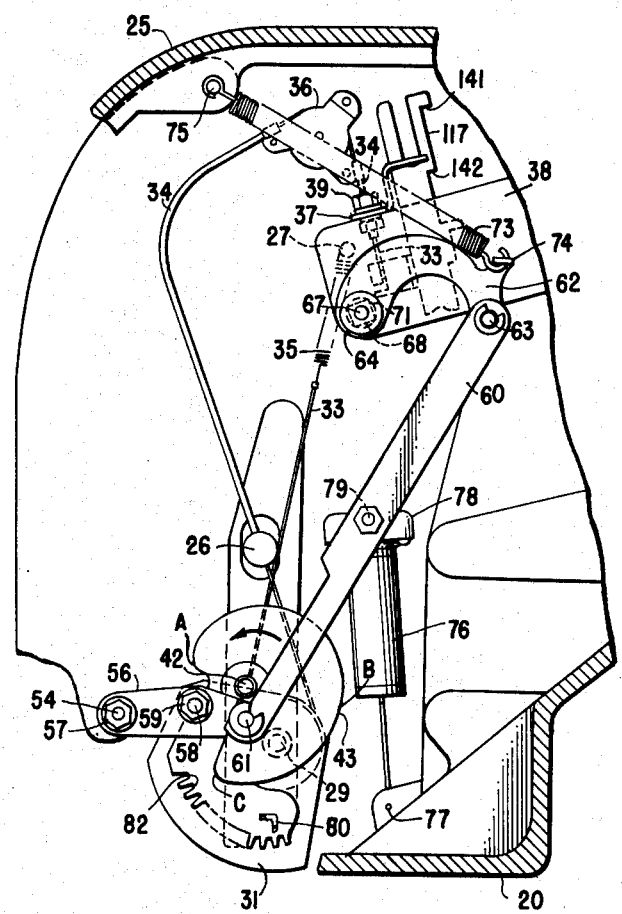
FIG. 11 is a fragmentary, vertical sectional view taken generally along the line 11—11 of FIG. 10.

Each of the auxiliary printing sectors 31 is driven by a cable 33 that is led through a Bowden cable casing 34 which is supported at one end by means of the cable guide shaft 26, the cable drive and guide shaft being shown and described in detail in U.S. Patent No. 3,068,718 issued December 18, 1962 in the name of C. E. Adler. One end of each of the cables 33 is connected to the selective numbering device as hereinafter described and the other end of each of the cables is connected to its respective return spring 35 hooked over the threaded shaft 27, each of the cables 33 being secured intermediate its ends to its respective printing sector 31. The cables 33 before they reach the printing sectors 31 are each run over a floating sheave mounted within a bracket assembly 36 as shown in detail in the foregoing U.S. Patent No. 3,068,718, the bracket assemblies 36 being attached between ends of sections of the cable casings 34 as shown in such patent. The ends of the cable casings 34 remote from the cable guide shaft 26 are supported on a bracket 37 extending across the width of the printer case 25 between frame members 38, each of such ends being attached to the bracket 37 by means of an internally threaded adjustment sleeve 39 received in a notch 40 in the bracket 37. The adjustment sleeve 39 has a split lower end on which a nut 41 is threaded. When the nut 41 is loose the sleeve 39 can be turned to adjustably feed the cable casing 34 in one direction or the other. This provides a trial and error adjustment which is used during the initial set up of the equipment to make sure that when a "two," for example, is punched on the key board (keys 32) a "two" is printed by the respective printing sector 31. As shown in FIG. 11, the cables 33 extend out of their casings below the adjustment sleeves 39 for attachment to the selective numbering mechanism.

Figure 10:
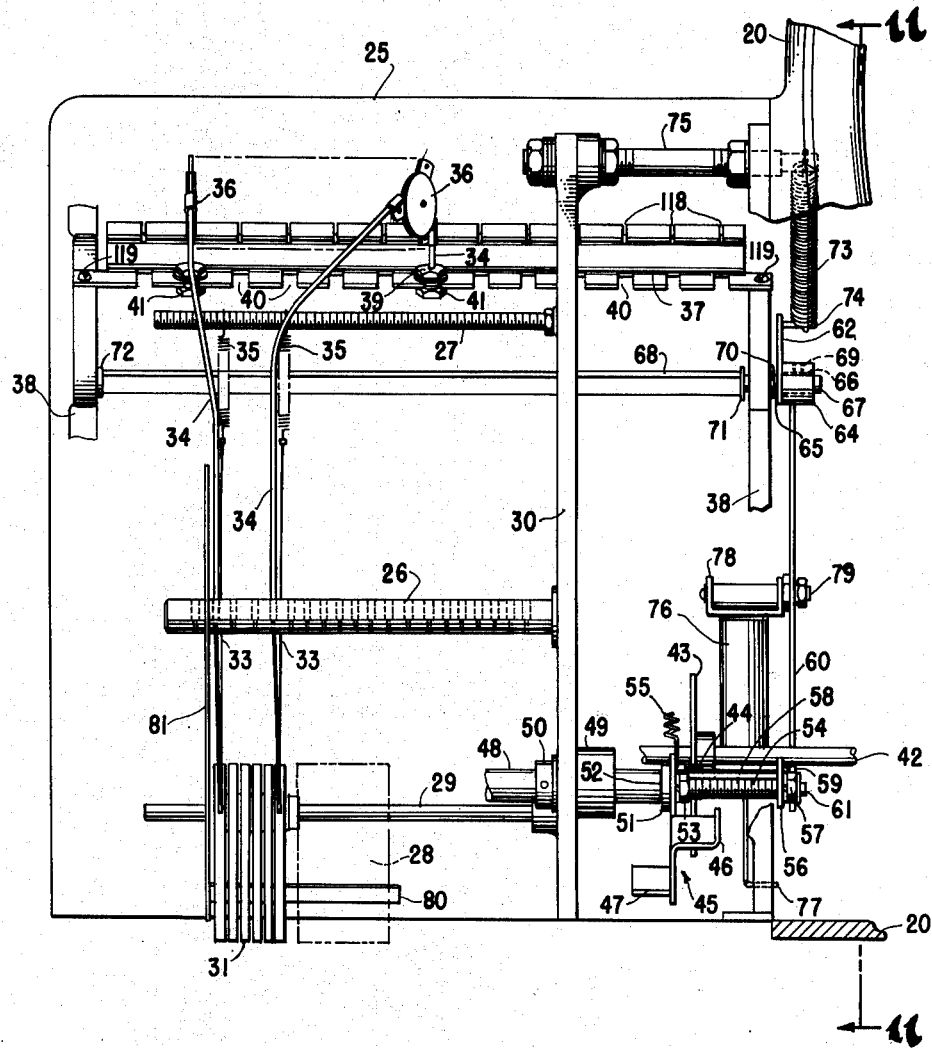
FIG. 10 is a reduced, fragmentary, rear elevational view corresponding generally to FIG. 6, showing the overall printing mechanism and the drive mechanism for the selective numbering device of the invention.

The basic printing mechanism is driven by means of a horizontal shaft 42 (FIG. 10) which is driven in turn by the motor of the mechanical chart reading mechanism. FIG. 10 corresponds to FIG. III in the foregoing U.S. Patent No. 3,093,066, most of the basic printing mechanism being omitted from both such FIGS. 10 and III and most of the record strip mechanism being omitted from such FIG. 10 and enough of the selective numbering mechanism of the invention being added in such FIG. 10 to illustrate the drive for the selective numbering mechanism. End frame 30 and shaft 42 correspond directly to end frame 16 and shaft 19, respectively, in FIG. III in such U.S. Patent No. 3,093,066. Every time that the chart reading mechanism makes a weight reading it sets up the printing sectors 28 and also turns the shaft 42 through one revolution to make a print. The shaft 42 drives the printing mechanism in the case 25 and also the roller printer in the housing 24 (FIG. 1) as shown and described in the foregoing U.S. Patent No. 2,922,361 and also the selective numbering mechanism of the invention through a cam 43 fixed to the shaft 42. The cam 43 corresponds directly to the cam 20 in FIG. III in the foregoing U.S. Patent No. 3,093,066, such prior cam 20 driving the prior record strip mechanism. The printer optionally is built with or without the prior record strip mechanism. However, in either case, the cam drive and part of the record strip mechanism is used to drive the selective numbering device of the invention. In other words, in adding the selective numbering device of the invention to the basic printer, the prior cam 20 for driving the record strip mechanism is used also to drive the selective numbering device which is connected to the record strip mechanism to work as one therewith.

The cam 43 drives a roller 44 carried by a strip ejector plate 45, having ears 46 and 47, connected to an oscillatable shaft 48 which is journaled in a boss 49 on the end frame 30 and which is provided with a collar 50 to limit axial movement of the shaft to the right as viewed in FIG. 10. The plate 45 forces a spacer 51 against a shoulder 52 on the oscillatable shaft 48, the plate 45 being held in place by means of a nut 53 on a threaded end 54 of the shaft 48. Accordingly, the oscillatable shaft 48 and the plate 45 are movable as one.

The cam 43 moves the roller 44 in opposition to a return spring 55. An arm 56 is secured to an extended part of the threaded shaft end 54, there being a nut 57 forcing the arm 56 against a shoulder on the end of such extended part of the threaded shaft end 54. An extension 58 of the strip ejector plate 45 ties such plate 45 to the arm 56, the extension 58 having a threaded end which carries a nut 59 (FIG. 11) which holds the arm 56 in place on the extension 58. Thus, the strip ejector plate 45, the arm 56 and the oscillatable shaft 48 are rockable together as one about the axis of the shaft 48. Oscillation of the arm 56 drives the selective numbering mechanism of the invention.

The arm 56 is pivotally connected to the bottom of a link 60 at 61 and the upper end of the link 60 is pivotally connected to an arm 62 at 63. Integrally formed with the arm 62 are a hub 64 and a flange 65. The hub 64 is lined with a split sleeve 66 which together with the flange 65 is received on a round end 67 of a square shaft 68. Two set screws 69 fix the arm assembly consisting of the arm 62, hub 64, flange 65 and split sleeve 66 to the round end 67 of the square shaft 68. The round end 67 of the square shaft 68 is journaled in a bushing 70 in the respective frame member 38, there being a round washer 71 on the square shaft 68 limiting axial movement of the shaft 68 to the right as viewed in FIG. 10. The other end of the square shaft 68 also is round and is journaled in a bushing 72 in the other frame member 38. A return spring 73 extends between an ear 74 on the arm 62 and a stud 75, there being three of the studs 75 (only one shown) for supporting the end frame casting 30 from the dial housing 20. An ordinary air dashpot 76 has its plunger operatively connected at 77 to the housing 20 and is supported on a bracket 78 rotatably mounted on a stud 79 carried by the link 60 intermediate its ends.

In operation, as hereinbefore described, the shaft 42 and thus, the cam 43 is turned through one revolution for each printing cycle. As soon as a print cycle starts, the cam 43 starts rotating in the direction indicated by the curved arrow in FIG. 11 and immediately starts lifting, which lifting action continues for about three-quarters of a revolution. This lifting starts at point A (FIG. 11) on the cam 43, the cam 43 driving the roller 44 in opposition to the spring 55. From point A on the cam 43 to point B on the cam 43, the weight printing sectors 28 are being positioned while a detent bar 80 carried by a detent actuating link 81 of the basic printing mechanism (correspond to detent bar 173 and one of the detent actuating links 174, respectively, disclosed in the foregoing U.S. Patent No. 2,922,361) is lifted to an inoperative position out of locating slots 82 in the printing sectors 28 and 31, and the arm 56 is rocked in a clockwise direction about the axis of the shaft end 54 as viewed in FIG. 11. This clockwise rotation of the arm 56 pulls the link 60 downwardly in opposition to the spring 73 which in turn rocks the arm 62 and the square shaft 68 attached thereto clockwise, as viewed in FIG. 11, about the axis of the square shaft 68. The square shaft 68 is rocked through an angle hereinafter described and its rocking operates the selective numbering mechanism as also hereinafter described. From point B to point C on the cam 43, the selective numbering mechanism dwells and the print is made, the detent bar 80 dropping into the sector slots 82 at joint B and staying in until point C to lock the sectors in place for printing. At point C on the cam 43, the cam 43 falls away from the roller 44 and continues on to its home position that is shown in FIG. 11. As soon as the cam 43 falls away from the roller 44 at point C, the printing operation being completed by this time, the plate 45, arm 56, link 60, and arm 62 are returned to their home positions by means of the springs 55 and 73, the return being slowed down by the dashpot 76. This returns the square shaft 68 to its home position shown in FIG. 11 which in turn returns the selective numbering mechanism to its home position as described hereinafter. For a clear understanding of the drive for the selective numbering device it is only necessary to understand that after the initiation of a print cycle the square shaft 68 is rocked clockwise as viewed in FIG. 11 through an angle hereinafter described in opposition to the return spring 73, it then is permitted to dwell while a print is made, and then it is returned to its home position shown in FIG. 11 ready for the next printing cycle.

Figures 3, 4, 5:
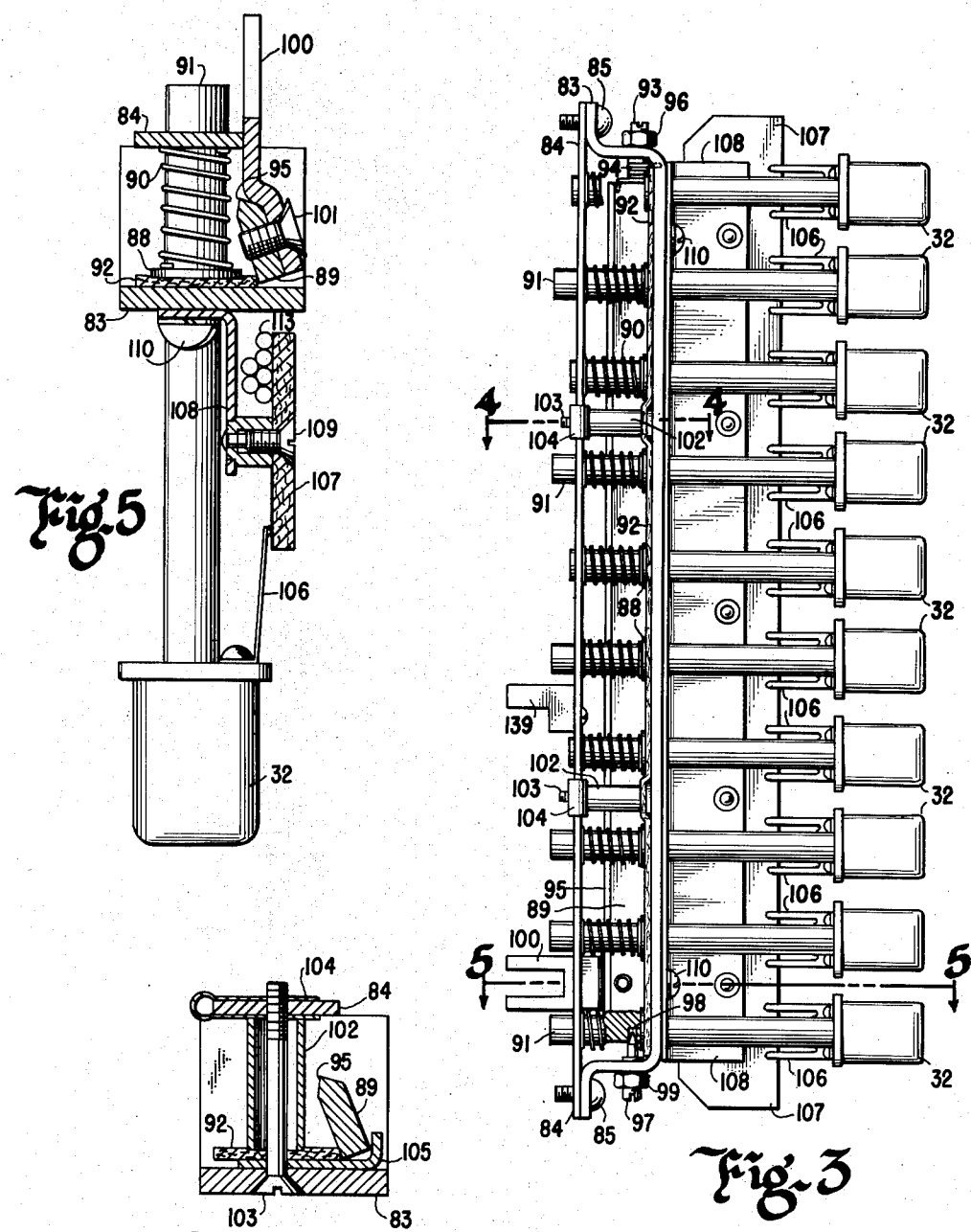
FIG. 3 is an enlarged, side elevational view of one bank of keys for the keyboard shown in FIG. 1.
FIG. 4 is an enlarged, horizontal sectional view taken along the line 4—4 of FIG. 3.
FIG. 5 is an enlarged, horizontal sectional view taken along the line 5—5 of FIG. 3.

One of the twelve identical vertical rows of keys 32 shown in FIG. 1 is shown in detail in FIG. 3 together with their adjuncts. The keys 32 are slidably mounted in aligned holes of a bracket 83 and a plate 84 which are attached by means of two screws 85 to two plates 86 (FIG. 7) connected in turn by means of screws 87 to the inside of the printer case 25. The vertical rows of keys, i.e., one bank, can be removed as a unit after the two screws 85 are removed. Intermediate the bracket 83 and the plate 84 each of the keys 32 has a collar 88 adapted to cooperate with a latch bar 89. The cooperating portions of the collars 88 and the latch bar 89 are such that the depression of any key 32 releases any other key that might previously have been depressed and causes the newly depressed key 32 to be caught and retained in its depressed position. Springs 90 sleeved over each of the stems 91 of the keys 32 and compressed between the bracket 83 and the plate 84 urge the keys 32 outwardly toward their non-operated positions, there being a strip of felt 92 between the bracket 83 and the key collars 88 acting as a cushion.

The latch bar 89 is pivotally mounted at its upper end by means of a cone-pointed screw 93 which is threaded through the bracket 83 and has its cone-point received in a hole (not shown) in the latch bar 89 and that is surrounded by a coil spring 94 located between the bracket 83 and the latch bar 89. One end of the spring 94 so bears on the latch bar 89 and the other end of the spring 94 so bears on the bracket 83 that a wedge-shaped, locking end 95 of the latch bar 89, as viewed in FIG. 5, is urged resiliently toward the key stems 91. A lock nut 96 holds the screw 93 in its adjusted position. The latch bar 89 is pivotably mounted at its lower end by means of a cone-pointed screw 97 which is threaded through the bracket 83 and has a reduced cone-pointed end received in a hole 98 in the latch bar 89. A lock nut 99 holds the screw 97 in its adjusted position. A bifurcated reset arm 100 extending in the direction of the key stems 91 is attached by means of a screw 101 to the latch bar 89. The bracket 83 and the plate 84 are rigidly spaced-apart by means of two tubes 102 through each of which extends a screw 103 that extends first through the bracket 83, through the tube 102 and then through a speed nut 104 (single thread nut) clipped over the plate 84, there being a hole in the plate 84 through which the upper end of the screw 103 extends as viewed in FIG. 4. Each of the tubes 102 presses down on the felt strip 92 which in turn pinches a clip 105 between it and the bracket 83, the screws 103 extending through suitable openings in the clips 105 and the felt strip 92 as shown in FIG. 4. As also shown in FIG. 4, the clip 105 limits movement of the latch bar 89. This is for the purpose of preventing the elongated slender latch bar 89 from bowing out. The clips 105 are held down securely by the tubes 102.

In operation, depression of any one of the keys 32 causes the respective collar 88 to cam the locking end 95 of the latch bar 89 outwardly in opposition to the spring 94 permitting the spring 90 of any previously operated key 32 to return such previously operated key to its home position (home positions shown in FIG. 3). After such release of the previously operated key 32, the collar 88 of the newly operated key 32 catches on the lock end 95 of the resiliently biased latch bar 89 and is held in its depressed position. Hence, depresison of any key 32 releases any other key that might previously have been depressed and causes the newly depressed key to be caught and retained in its depressed position. The row of keys is cleared by movement of the reset arm 100, as herein-after described, to rock the latch bar 89 just as though it was rocked by depression of a key 32. Only one of the keys 32 can be in operated, locked position at any one time.

Figure 2:
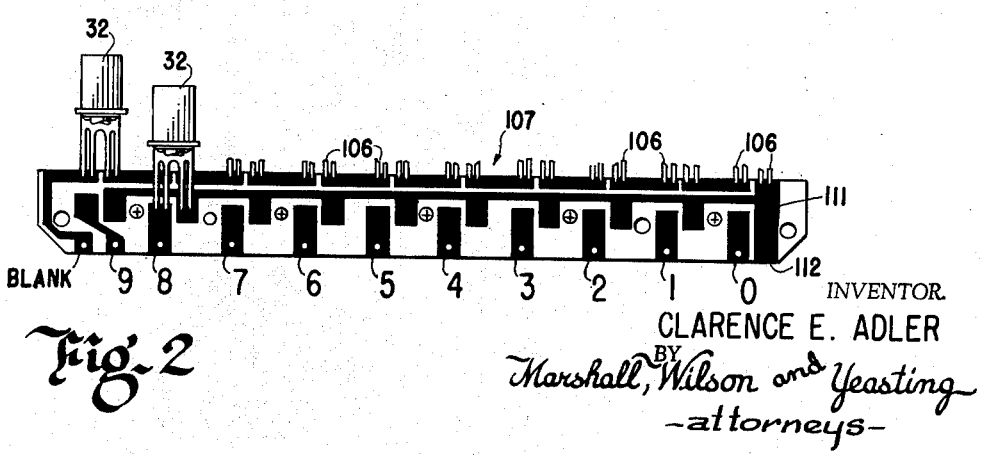
FIG. 2 is a fragmentary, plan view of a printed circuit board and brushes carried on key stems showing one key depressed to engage strip contacts completing an electrical circuit corresponding to such operated one of the keys.

An electrical readout (FIGS. 1, 2, 3 and 5) is provided. Each of the keys 32 carries a brush 106 having four sections or terminals. The brushes 106 are engageable with strip contacts 111 on a printed circuit board 107 juxtaposed to the key stems 91 to complete electrical circuits which correspond to the operated ones of the keys 32. The board 107 is carried by an angle bracket 108, the board 107 being connected to the bracket 108 by means including screws 109 and the bracket 108 being connected in turn to the bracket 83 by means of screws 110. The strip contacts 111 have eleven output terminals identified as "Blank, 9, 8, etc." in FIG. 2 and a common input terminal 112. Lead wires 113 (FIGS. 1 and 5) connect the output terminals with ordinary readout mechanism (not shown), such as the solenoids of an electric typewriter. As indicated in FIG. 2, provided that all of the keys 32 are in their non-operated positions, the brushes 106 complete a circuit from the common input terminal 112 to the "Blank" output terminal. Hence, in this condition, the "Blank" lead wire 113 is "hot" and the readout mechanism will be energized to produce a "Blank" reading (required in some business machine operations). As shown in FIG. 2, when the number eight key 32 is operated, the blank circuit is broken and a circuit is completed from the common input terminal 112 through such number eight key's brush 106 to the number "8" output terminal. Hence, in this condition, the "8" lead wire 113 is "hot." Operation of the other keys 32 complete circuits to their respective lead wires 113 in a similar fashion. In each instance, the four sections or terminals of each brush 106 act as jumpers completing circuits that produce appropriate electrical readout signals.

One of the features of the invention resides in providing a brush 106 for each number to be read out, which brush is certain to make electrical contact in contrast to the prior brushes in the prior electrical readouts wherein only one brush was provided for each order, i.e., for each set of nine numbers, which prior brushes sometimes came to rest between terminals. Prior electrical readouts include one brush operatively connected to the keys in each row of keys. The prior brush was moved on selector contacts to a position corresponding to the operated ones of the keys. This arrangement was generally unsatisfactory because as the parts wore the brush often stopped between the terminals, producing no electrical readout at all.

Figure 7:
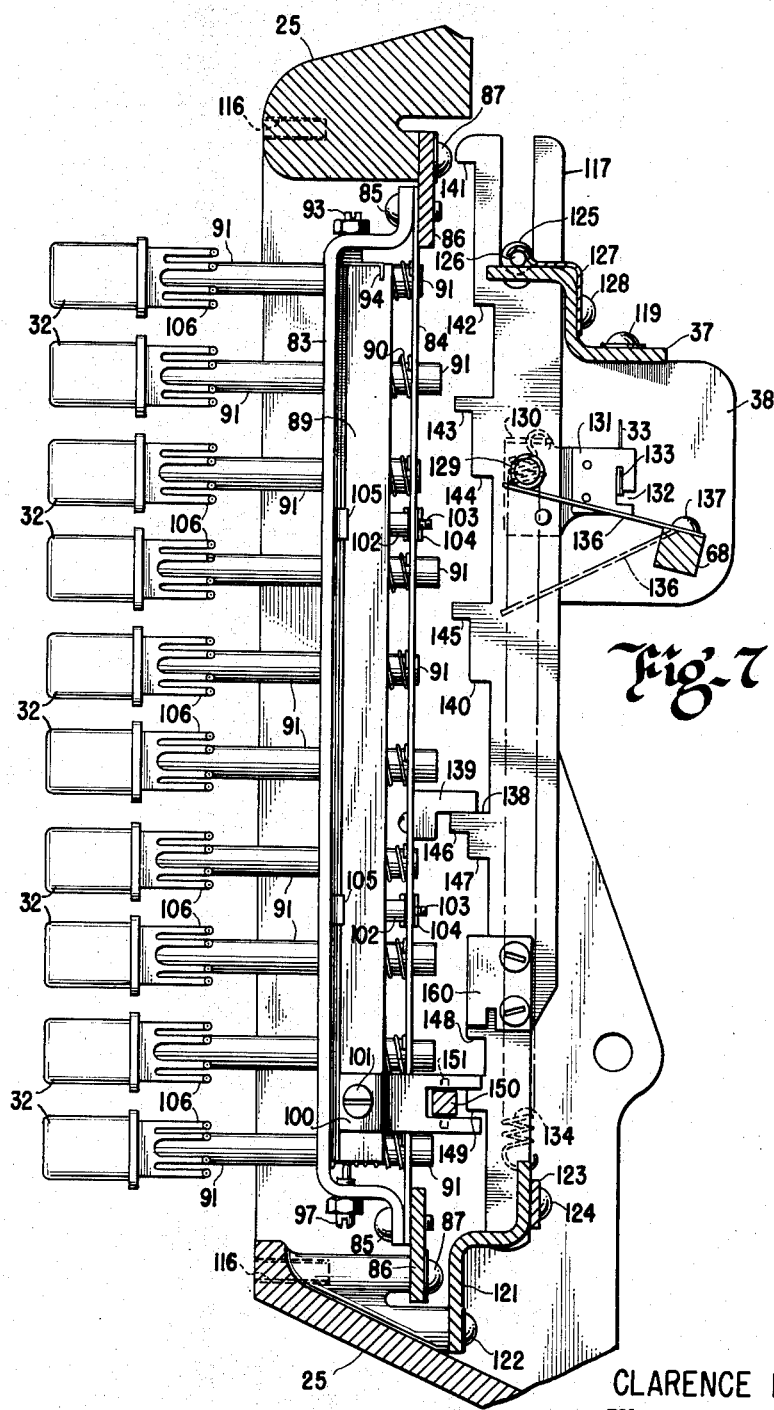
FIG. 7 is a vertical sectional view taken along the line 7—7 of FIG. 6.

The row of keys 32 which is shown in FIG. 3 is illustrated in FIGS. 6 and 7 connected in the printer. Only one of the vertical row of keys 32 and their associated working parts will be described, since each of the twelve rows is alike. The row of keys is connected in the printer, after a front plate 114 (FIG. 1) is removed by removing four screws 115 (FIG. 1) that thread into tapped holes 116 (FIG. 7) in the printer case 25, by means of the two screws 85 which extend through openings in the bracket 83 and the plate 84 and are threaded into the two plates 86. The prior selective numbering device included number keys operatively connected to the printing sectors, which keys were difficult to push in because the return spring forces in the printer and friction of the cables in their casings had to be overcome by finger pressure. The keys 32 of the selective numbering device of the invention function as stops which limit the movement of slides 117 (one slide 117 for each vertical row of ten keys) that set up the printing sectors 31 in opposition to the return springs 35 (FIG. 10). The keys 32 push in easily since they function merely as pre-selectors, the slides 117 being driven by the square shaft 68. This is one of the features of the printer. Also, this arrangement produces more accurate results because the mechanism does not get out of adjustment.

The slide 117 is guided in two channels. The upper channel is formed by cutting a notch 118 (FIGS. 6 and 10) in the bracket 37, there being thirteen of the notches 118 ready in case twelve vertical rows of the keys 32 are used with the additional notch 118 being used in connection with the automatic resetting mechanism shown in FIG. 8. As shown in FIG. 7, the bracket 37 is Z-shaped with the notches 118 being cut in the upper arm of the Z and the lower arm of the Z being attached to the frame members by means of screws 119. The lower channel is formed by cutting a notch 120 in a Z-shaped bracket 121 connected to the printer case 25 by means of screws 122. A plate 123, connected to the bracket 121 by means of screws 124, keeps the bottoms of the slides 117 in place. There are thirteen slots 122 corresponding to the thirteen slots 118. The upper end of the slide 117 is bifurcated, there being a roller 125 betwen the bifurcations guiding the upper end of the slide 117 as it is moved up and down. The rollers 125, one for each of the slides 117, are rotatably mounted on a stationary shaft 126 which is held by means of a clip 127 clamped to the upper Z-shaped bracket 37, the clip 127 being attached to the bracket 37 by means of screws 128.

The slide 117 carries a stud 129 extending to the left as viewed in FIG. 6, a bracket arm 130 extending in the opposite direction and a bifurcated cable clamp bracket 131 having a slot 132 for the reception of a ferrule 133 on the cable 33 to connect the cable 33 to the slide 117 (the other end of the cable 33 is connected to its return spring 35 with the printing section 31 being connected to the cable intermediate its ends as described in connection with FIGS. 10 and 11). This operatively connects the slide 117 to its respective printing sector 31, such sector 31 being set up in printing position by the slide 117. A spring 134 is connected between the arm 130 and a hole 135 in the lower Z-shaped bracket 121, there being a series of holes 135 one for each vertical row of keys 32.

As hereinbefore described, after the initiation of a print cycle, the square shaft 68 is rocked clockwise as viewed in FIG. 11, through an angle which is shown in FIG. 7, in opposition to the return spring 73 (FIG. 11), it then is permitted to dwell while a print is made, and then it is returned to its home position shown in FIG. 11 ready for the next printing cycle. The angle through which the square shaft 68 is rocked is indicated by the home position shown in solid lines of a drive finger 136 and the lowermost position shown in broken lines of the drive finger 136 (FIG. 7). The drive finger 136 is one of a series of fingers 136 shown in FIG. 6 which extend from a single member attached by means of screws 137 to the top of the square bar 68, there being one drive finger 136 for each vertical row of keys 32. The drive fingers 136 shown in FIGS. 6 and 7 drivingly engages the stud 129.

In operation, the keys 32 of the selective numbering device as shown in FIG. 7 are all in their unoperated positions. In this condition, the finger 136 by engagement with the stud 129 urges the slide 117 upwardly in opposition to the spring 134, upward movement of the slide 117 being limited by engagement of a stop surface 138 on the slide 117 with a stop 139 extending from the stationary plate 84. Downward movement of the slide 117, when none of the keys 32 is operated, is limited by engagement of a stop surface 140 with the opposite side of the stop 139. This is the maximum downward travel of the slide 117 and sets up a blank on the operatively attached printing sector 31. The slide 117 also has stop surfaces 141, 142, 143, 144, 145, 146, 147, 148 and 149.

The key stems 91 function as stops which limit the downward movement of the slide 117 that sets up the printing sectior 31, the keys 32 functioning as pre-selectors. The key stems 91, when they are pushed in to their fully operated positions (only one key 32 can be operated at any one time), engage the slide stop surfaces, when the slide 117 is operated, as follows:

top or "9" key stem 91 engages slide stop surface 141
next or "8" key stem 91 engages slide stop surface 142
next or "7" key stem 91 engages slide stop surface 143
next or "6" key stem 91 engages slide stop surface 144
next or "5" key stem 91 engages slide stop surface 145
next or "4" key stem 91 engages slide stop surface 140
next or "3" key stem 91 engages slide stop surface 146
next or "2" key stem 91 engages slide stop surface 147
next or "1" key stem 91 engages slide stop surface 148
bottom or "0" key stem 91 engages slide stop surface 149

Although all of the keys 32 move through equal distances when operated, the key stems 91 are of several lengths to suit the pattern of the slide stop surfaces 141–149. After the initiation of a print cycle, the square shaft 68 is rocked to rock in turn its finger 136 from the full line position of the finger 136 shown in FIG. 7 to the broken line position of the finger 136. The stud 129 on the slide 117 follows the finger 136 because it is kept in engagement at all times with the finger 136 by the action of the spring 134. Accordingly, the slide 117 is driven by the spring 134 downwardly after the initiation of a print cycle. If no key 32 has been depressed, stop surface 140 on the slide 117 engages the stationary stop 139 and a blank is set up on the printing sector 31. If a key 32 has been operated, its key stem 91 obstructs the path of the corresponding one of the stop surfaces 141–149 on the slide 117 as set forth above. Hence, the depression of the "9" key 32 followed by downward movement of the slide 117 sets up a "9" on the printing sector 31, depression of the "8" key 32 followed by downward movement of the slide 117 sets up an "8" on the printing sector 31, etc. Stop surface 140 engages the "4" key stem 91 when such key stem 91 is operated to set up a "4" in the printer and also is engageable with the stationary stop 139 when no key stem 91 is operated to set up a blank in the printer. After the printing sector 31 is set up, the foregoing dwell occurs while the print is made and then the finger 136 is returned to its home or full line position shown in FIG. 7 lifting the slide 117 in opposition to the spring 134 to its home position (slide stop surface 138 against stop 139 as shown in FIG. 7).

The printing sectors 31 are like the printing sectors in the prior selective numbering mechanism except that the printing type or the sectors 31 are not arranged in the usual order from "0–9". This arrangment makes possible the compact design of the slide 117. Where the "9" printing type usually would be placed on the printing sector 31 a "0" is placed, a "6" takes the place of the usual "8," a "5" takes the place of the usual "7," an "8" takes the place of the usual "6," a "4" takes the place of the usual "5," a "7" takes the place of the usual "4," a "2" takes the place of the usual "3," a "9" takes the place of the usual "2," a "1" is put in the usual place of the "1," and a "3" is put in the usual place of the "0". The slide 117, for example is so designed that movement of slide stop surface 141 to engage the "9" key stem 91 rotates the printing sector 31 to a position such that an ordinary printing wheel or sector would set up a "0" to be printed. However, a "9" is printed because the "9" printing type is located where the "0" type usually is located. Hence, the depression of any one of the keys 32 sets up the printing sector 31 to print a number which corresponds to the number punched in the keyboard.

The row of keys 32 is cleared by movement of the bifurcated reset arm 100 to rock the latch bar 89 just as though the latch bar 89 was rocked by depression of a key 32 as hereinbefore described. The reset arms 100 for all of the vertical rows of the keys 32 are driven simultaneously by means of a slidable square reset bar 150 carrying pins 151 one for each of the bifurcated reset arms 100, the square bar 150 passing through the bifurcations of the reset arms 100 as best shown in FIG. 7 and the pins 151 being juxtaposed to the bifurcations of the reset arms 100 as best shown in FIG. 6 so that movement of the square bar 150 to the left as viewed in FIG. 6 carries the pins 151 into engagement with the reset arms 100 to pivot the latch bars 89 attached to the reset arms 100, causing the latch bars 89 to release all of the operated keys 32 and thereby clearing the keyboard. The right hand end of the square bar 150, as viewed in FIG. 6, is slidably mounted in an opening 152 in the respective frame member 38 and the left hand end of the square bar 150 is bifurcated to receive the upper end of a lever 153, there being a pin 154 through the bifurcations and the lever 153 to form a pivotal connection. The lever 153 is fulcrumed on a pin 155 (FIGS. 6 and 7) carried by the Z-shaped bracket 121. The upper left hand end of the lever 153 as viewed in FIG. 6 has a round extension 156 received in a coil spring 157 which has an end received in an opening 158 in the respective frame member 38. The spring 157 urges the lever 153 and the attached square bar 150 to the right as viewed in FIG. 6. The normal or home, i.e., the unoperated position of the square bar 150, is shown in FIG. 6. The lever 153 carries a roller 159 (FIGS. 6 and 8).

The slide 117 carries a bracket 160 which is arranged as shown in FIGS. 6 and 7 to be moved closely adjacent the bifurcations of the reset arm 100 when the slide 117 is in its down position. This locks the reset mechanism whenever selective characters or numbers are set up for printing so that reset cannot occur during printing.

The square reset bar 150 is driven by means of the manually or automatically operated reset mechanism shown in FIGS. 8 and 9. The reset mechanism includes a vertical bank of buttons and a bar, which are mounted similarly to the way in which the vertical rows of keys 32 are mounted, which bank includes a reset bar 161, a manual reset button 162 and an automatic reset button 163 (FIGS. 1 and 8). The reset bar 161 is carried by two plungers 164, the manual reset button 162 is carried by a stem 166 and the automatic reset button 163 is carried by a stem 165. The plungers 164 and stems 165 and 166 are slidably mounted in aligned holes of a bracket 83a and a plate 84a which are attached by means of two screws 85a to the two plates 86 connected in turn by means of screws 87 to the inside of the printer case 25. The slidable mounting for the plungers 164 and the stems 165 and 166 is similar to the slidable mounting for the key stems 91 (FIGS. 3 and 7), similar reference numerals in FIGS. 3 and 7 and 8 identifying parts which are alike in structure and function. The reset buttons 162 and 163 are held in their depressed, operated positions by the reset bar 89a and are returned upon release by the springs 90a just as are the number keys 32. However, the button stems 165 and 166 differ from the key stems 91 by being bifurcated at their ends remote from the buttons. No springs surround the plungers 164 to produce a spring return such as is provided for the button stems 165 and 166 and the plungers 164 are not locked in their depressed, operated positions by the reset bar 89a.

The manually or automatically operated reset mechanism includes a slide 167 (FIG. 9) which is slidably mounted in the same way as is the slide 117 (FIG. 7). The upper Z-shaped bracket 37 includes a channel notch 118 in which the upper end of the slide 167 is slidable and the lower Z-shaped bracket 121 includes a notch 120 in which the lower end of the slide 167 is slidable. The plate 123, connected to the bracket 121 by means of the screws 124, keeps the bottom of the slide 167 in place. The upper end of the slide 167 is bifurcated there being a roller 125 between the bifurcations guiding the upper end of the slide 167 as it is moved up and down. The roller 125 is rotatably mounted on the stationary shaft 126 which is held in place as described hereinbefore. The slide 167 carries a stud 168 which functions as a pivot for a rocking lever 169 and is provided with a circumferential groove 170 which receives an end of a spring 171 extending between such groove 170 and a hole 172 (FIG. 6) in the plate 123. A spring 173 coiled around the stud 168 between the slide 167 and the rocking lever 169 as best shown in FIG. 6 urges the rocking lever 169 normally into engagement with a stop pin 174 (FIGS. 8 and 9) carried by the slide 167. Up and down movement of the slide 167 is not impeded by the button stems 165 and 166 because the slide 167 moves between the bifurcations of such stems. The lower end of the slide 167 has a bent-out portion forming a cam 175 (FIGS. 6, 8 and 9) which cooperates with the roller 159 on the lever 153. The rocking lever 169 has a notched portion 176 having a driven surface 177.

In operation, the slide 167 is shown in FIGS. 6 and 8 pulled into its down or home position by the spring 171 with the rocking lever 169 in its normal position urged against the stop pin 174 by the spring 173. If it is desired that all of the number keys 32 be returned automatically to their home positions at the end of every printing cycle, i.e., if it is desired to clear the keyboard shown in FIG. 1 automatically at the end of every printing cycle, the automatic reset button 163 is operated. This is the position of the button 163 shown in FIG. 8. Operation of the automatic reset button 163 does nothing except to release the manual reset button 162.

After the initiation of a print cycle, the square shaft 68 is rocked to rock in turn a finger 178, attached to the top of the square shaft 68, by means of a screw 179, from the full line position of the finger 178 shown in FIG. 8 to the broken line position of the finger 178. During the downward rocking of the finger 178, the finger 178 engages the adjacent side of the rocking lever 169 and pivots the lever 169 in opposition to the spring 173 counterclockwise as viewed in FIG. 8 about the axis of the stud 168 and, thus, pivots the upper end of the lever 169 out of its engagement with the stop pin 174. However, once the free end of the finger 178 is received in the notch 176 in the rocking lever 169, the finger 178 no longer contacts the lever 169 and the spring 173 returns the lever 169 into engagement with the stop pin 174. As hereinbefore described, the selective character or number printing sectors 31 are set up into printing positions during the time that the finger 178 moves from its full line to its broken line position and, after the printing sectors 31 are set up, a dwell occurs while the print is made. After the dwell occurs, the square shaft 68 returns the finger 178 to its home or full line position shown in FIG. 8.

During the time that the finger 178 returns to its home or full line position shown in FIG. 8, the free end of the finger 178 catches on the surface 177 at the notch 176 in the rocking lever 169 and lifts the lever 169 and the slide 167 attached thereto up in opposition to the spring 171 until the free end of the finger 178 moves out of engagement with the catch surface 177, whereupon the spring 171 returns the slide 167 to its home position shown in FIG. 8. This upward movement of the slide 167 causes the cam 175 on the slide, by engagement with the roller 159 on the lever 153, to pivot the lever 153 counterclockwise as viewed in FIG. 6 in opposition to the spring 158 (FIG. 6) about the axis of the pivot pin 155. This drives the slidable square reset bar 150 to the left as viewed in FIG. 6. As described above, movement of the reset bar 150 to the left carries the pins 151 into engagement with the reset arms 100 to pivot the latch bars 89 attached to the reset arms, causing the latch bars 89 to release all of the operated keys 32 and thereby clearing the keyboard. The latch bar 89a has no such reset arm 100, the automatic reset button 163 remaining in its depressed, operated position. The return of the slide 167 to its home position permits the spring 158 to return the slidable square bar 150 to its home position shown in FIG. 6.

Accordingly, if automatic reset is desired after every printing cycle, the automatic reset button 163 is pushed in once and automatic resetting of all of the character or number keys 32 occurs after every printing cycle. This is one of the features of the printer.

If manual reset is desired, the manual reset button 162 is pushed in. This causes two things to happen. First, the reset bar 89a is pivoted to release the automatic reset button 163 which is returned to its unoperated position by its return spring 90*a*, the reset bar 89*a* catching and holding the manual reset button 162 in its depressed position. Second, the manual reset button stem 166 so pushes the lever 169 counterclockwise about the axis of the stud 168 in opposition to the spring 173 that the lever 169 is out of the reach of the finger 178 during all positions of the finger 178. Accordingly, the finger 178 accomplishes nothing as it moves through its cycle and the automatic reset mechanism is immobilized. Manual resetting is accomplished by depressing the reset bar 161 as described hereinafter.

Another feature resides in a mechanical interlock between the automatic reset button 163 and the manual reset button 162. Only one or the other of the buttons can be operated at any one time. This is accomplished by making the button stems 165 and 166 long enough that if both are pushed in together they both engage the rocking lever 169 one on one side of the lever pivot 168 and the other on the other side of the lever pivot 168 and are prevented by the lever 169 from being pushed in far enough to be both caught and latched by the reset bar 89*a*.

The reset bar plungers 164 are tied together by a bracket 180 the ends of which carry rollers 181 that cam the slide 167 in opposition to the spring 171 in an upward direction perpendicular to movement of the reset bar 161. The bracket 180 is connected to the reset bar plungers 164 by means of two screws 182 and the rollers 181 move in parallel open-ended slots 183 in the slide 167 to prevent eccentrically applied forces applied to the reset bar from cocking the reset bar, the slots 183 being at an acute angle to the direction of movement of the reset bar 161. The slide 167 upon operation of the reset bar 161 operates the key resetting mechanism to clear the keyboard in the same way that it operates the key resetting mechanism during automatic resetting. One of the features of the printer resides in this reset bar stabilizer.

In the operation of the reset bar 161, its depression causes the rollers 181 to lift the slide 167 in opposition to the spring 171 until the rollers 181 are received in the closed bottoms of the parallel slots 183. Because the slots 183 are parallel to each other, one roller 181 cannot get ahead of the other roller 181 and, accordingly, even though finger or hand pressure is applied to the reset bar 161 eccentrically, the reset bar 161 moves horizontally without cocking as viewed in FIG. 8. Upward movement of the slide 167 causes the cam 175 on the slide, by engagement with the roller 159 on the lever 153, to pivot the lever 153 counterclockwise as viewed in FIG. 6 in opposition to the spring 158 about the axis of the pivot pin 155. This drives the slidable square reset bar 150 to the left as viewed in FIG. 6 to clear the keyboard as described above. The reset bar 161 then is released and it is returned by the spring 171 pulling the slide 167 downwardly to its home position shown in FIG. 8, the parallel slots 183 driving the rollers 181 outwardly as the slide 167 moves downwardly. Accordingly, manual reset is accomplished by first depressing the manual reset button 162, which is held in its depressed position by the reset bar 89*a* until it is released by operation of the automatic reset button 163, and then operating the reset bar 161 whenever it is desired to clear the keyboard after a print has been made. The reset bar 161 returns to its home position every time that it is released by the operator's hand.

In the overall operation of the selective numbering mechanism, selected ones of the keyboard keys 32 are depressed to print weight identification words such as "ore," "limestone," "tare," "gross," and "net" and selective numbers such as customer order or code numbers adjacent the weight print on a ticket inserted into the printer case 25. The stems of the keys 32 function as stops which limit the movement of the slides 117 that set up the printing sectors 31 in accordance with the depressed ones of the keys 32, the slides 117 moving downwardly, after the initiation of a print cycle, under the influence of the springs 134 as the power-driven square shaft 68 rocks its fingers 136 from the full line position shown in FIG. 7 to the broken line position of the finger 136. After the printing sectors 31 are set up, a dwell occurs while the print is made and then the fingers 136 are returned to their home positions lifting the slides 117 in opposition to the springs 134 to their home positions.

While the square shaft 68 rocks its fingers 136 downwardly, it also rocks its finger 178 downwardly from its full line postion shown in FIG. 8 to the broken line position of the finger 178. If the automatic reset button 163 has been depressed, return of the finger 178 to its full line position causes it to catch on the lever surface 177 and lift the lever 169 and the attached slide 167 which through the action of the cam 175 on the roller 159 carried by the lever 153 causes automatic resetting of all of the operated ones of the number keys 32 after every printing cycle. If the manual reset button 162 has been depressed, return of the fingers 178 to its full line position accomplishes nothing because depression of the manual reset button 162 causes its stem 166 to rock the lever 169 out of the path of the fingers 178. Keyboard resetting then is accomplished by operating the reset bar 161.

The embodiment of the invention described in connection with the drawings is to be regarded as illustrative only since the invention is susceptible to variation, modification and changes within the spirit and scope of the appended claims.

Having described the invention, I claim:

1. In a printer, in combination, a movable printing member, means including a bank of selectively operable keys for setting the member in printing position, the keys being movable between home and operated positions, operation of any one of the keys releasing any previously operated key, the last-operated key being retained in operated position, reset means operable after printing for resetting said last-operated key to the home position automatically, means including a selectively operable manual reset button, for immobilizing automatic operation of the reset means, and a selectively operable reset bar for resetting the last-operated key to the home position manually, the reset means including an automatic reset button, the buttons being movable between home and operated positions, means for retaining the last-operated button in operated position and for releasing either one of said buttons upon operation of the other button, and mechanical interlock means for preventing simultaneous movement of the buttons to their operated positions.

2. In a printer, in combination, a movable printing member, means including selectively operable keys for setting the member in printing position, the keys being movable between home and operated positions and the last-operated key being retained in operated position, reset means including a slide, resilient means urging the slide in a first direction and drive means operable after printing for driving the slide in the opposite direction in opposition to the resilient means, the slide being operatively connected to the actuated keys while being driven in said opposite direction for resetting said last-operated key to the home position automatically, means including a selectively operable manual reset button, for immobilizing automatic operation of the reset means, and a selectively operable reset bar for resetting the last-operated key to the home position manually, the reset means including an automatic reset button, the buttons being movable between home and operated positions, means for retaining the last-operated button in operated position and for releasing either one of said buttons upon operation of the other button, and mechanical interlock means for preventing simultaneous movement of the buttons to their operated positions.

3. In a printer, in combination, a movable printing member, means including a bank of selectively operable keys for setting the member in printing position, the keys being movable between home and operated positions and the last-operated key being retained in operated position, and reset means including a slide, first drive means for moving the slide in a first direction, second drive means movable in a path and operable after printing for driving the slide in the opposite direction, and a resiliently biased lever pivotably mounted on the slide, the second drive means engaging the lever when driving the slide in said opposite direction and the slide being operatively connected to the actuated keys while being driven in said opposite direction for resetting said last-operated key to the home position automatically, means including a selectively operable manual reset button, which by pivoting the lever out of the path of the second drive means immobilizes automatic operation of the reset means, and selectively operable means including a reset bar for driving the slide when automatic operation of the reset means is immobilized by operation of the manual reset button to reset the last-operated key to the home position manually.

4. In a printer according to claim 3 wherein the reset means includes an automatic reset button, the buttons being movable between home and operated positions, means for retaining the last-operated button in operated position, operation of one button releasing the other button, and the lever is arranged to be engageable simultaneously by one of the buttons at one side of its pivot and by the other one of the buttons at the other side of its pivot, to prevent simultaneous movement of the buttons to their operated positions.

5. In a printer, in combination, a movable printing member, means including a bank of selectively operable keys for setting the member in printing position, and reset means for resetting the keys to the home position automatically including a movably mounted slide, resilient means urging the slide in a first direction, drive means movable in said first direction and in the opposite direction, a lever pivotably mounted on the slide and defining a notch in juxtaposition with the drive means, a stop on the slide, spring means on the slide urging the lever toward the stop, the drive means when moving in said first direction pivoting the lever in opposition to the spring means away from the stop and accomplishing nothing and when moving in said opposite direction catching in the lever notch to drive the slide in said opposite direction in opposition to the resilient means, and means operatively connecting the slide to the actuated keys when the slide is being driven in said opposite direction.

6. In a printer according to claim 5 wherein means are provided including a selectively operable manual reset button, which by pivoting the lever out of the path of the drive means followed when moving in said opposite direction prevents automatic operation of the reset means, and a selectively operable reset bar for resetting the keys to their home positions.

7. In a printer according to claim 6 wherein the reset means includes an automatic reset button and the lever is arranged to prevent simultaneous operation of the buttons.

8. In cyclic printing means, in combination, a movable printing member, means including a bank of selectively operable keys for setting the member in printing position, the last-operated key being retained in operated position, selectively operable reset means for resetting the last-operated key in a first mode of operation wherein the keys are automatically reset at the termination of a printing cycle or for resetting said last-operated key in a second mode of operation wherein said reset means is manually actuated by means including a reset bar movable between a home position and an actuated position to reset the last-operated key when said bar is moved to said actuated position, said reset means including further means including a manual reset button movable between a home position and an actuated position for immobilizing automatic operation of the reset means in the first mode of operation so as to enable functioning of said reset means in said second mode of operation, said reset means further including means including an automatic reset button movable from a home position to an actuated position for releasing said manual reset button so as to enable automatic operation of said reset means in said first mode of operation, and means for retaining the last-operated button in actuated position and for releasing either one of said buttons upon actuation of the other button.

9. In a printer having a reset bar, a stabilizer comprising, in combination, two slidably mounted plungers carrying the reset bar, a resiliently biased slide defining a pair of parallel slots arranged at an acute angle to the direction of movement of the slidably mounted plungers, and means carried by the plungers and always received in the slots for driving the slide in a first direction generally perpendicular to said direction of movement of the plungers when force is applied to the reset bar, the resiliently biased slide driving the reset bar in a direction opposite to said first direction when said force is removed from the reset bar.

10. In a printer, in combination, a movable printing member, selectively operable keys for setting the member in printing position, the last-operated key being retained in operated position, and reset means for resetting said last-operated key to its home position including a manually-operable reset button, two slidably mounted plungers carrying the reset bar, a slide defining a pair of of parallel slots arranged at an acute angle to the direction of movement of the reset bar, resilient means urging the slide in a first direction, and a pair of rollers carried by the plungers and always received in the slots for driving the slide in opposition to the resilient means in a direction opposite to said first direction to reset said last-operated key, the resilient means returning the slide in said first direction to reset the reset bar.

References Cited by the Examiner

UNITED STATES PATENTS

| | | | |
|---|---|---|---|
| 1,214,030 | 1/1917 | Harrison | 235—145 |
| 1,335,067 | 3/1920 | Malcher | 177—3 X |
| 1,823,859 | 9/1931 | Hosack | 235—145 |
| 1,848,106 | 3/1932 | Carroll | 235—145 |
| 2,091,778 | 8/1937 | Garbell | 101—93 |
| 2,656,787 | 10/1953 | Koch | 101—93 |
| 2,707,432 | 5/1955 | Rindfleisch | 101—95 |

ROBERT E. PULFREY, *Primary Examiner.*

WILLIAM B. PENN, *Examiner.*